June 28, 1960     G. C. ALDOUS     2,943,178
ELECTRIC HEATING APPARATUS
Filed July 18, 1957
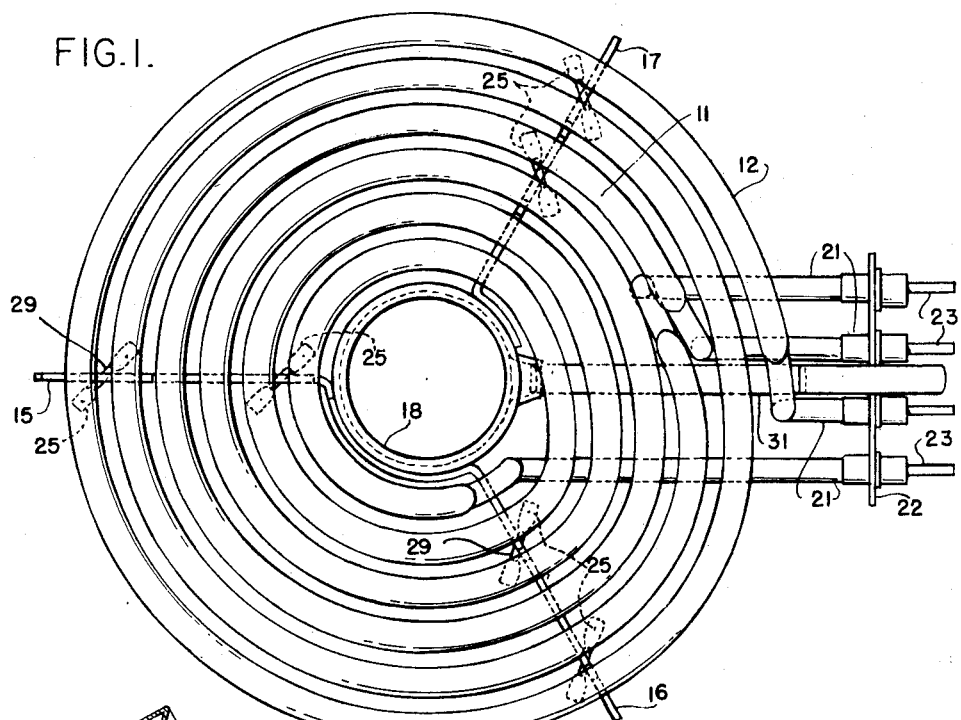
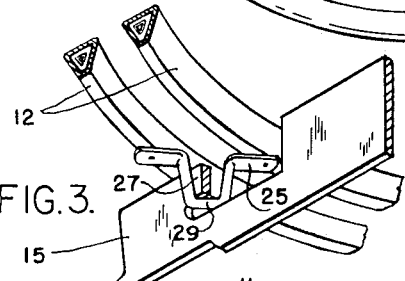
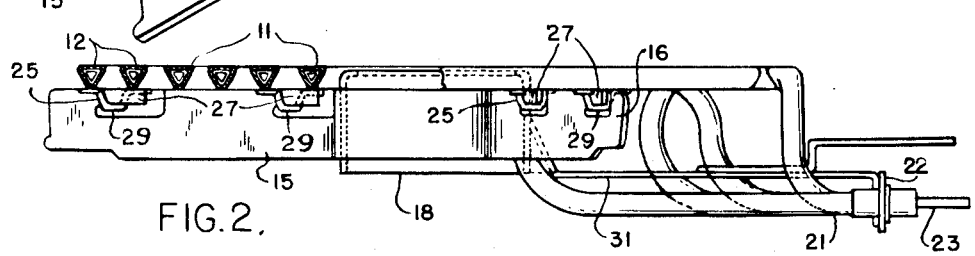
INVENTOR
GEORGE C. ALDOUS
BY M. C. Freudenberg
ATTORNEY

United States Patent Office 2,943,178
Patented June 28, 1960

2,943,178

ELECTRIC HEATING APPARATUS

George C. Aldous, Mansfield, Ohio, assignor to Westinghouse Electric Corporation, East Pittsburgh, Pa., a corporation of Pennsylvania Filed July 18, 1957, Ser. No. 672,599

4 Claims. (Cl. 219—37)

This invention relates to an electrical heating unit for a cooking platform or the like and has for an object to provide an improved arrangement for attaching a convoluted sheathed heater to a supporting frame.

One type of sheathed heater and frame assembly of the prior art is shown in P. M. Weyrick Patent 2,725,456, assigned to the present assignee. This patent shows a convoluted heater that is attached to a supporting spider framework and uses one U-shaped tie for each portion of the heater that is anchored to a spider leg.

The convoluted heater of the present invention is generally similar to that of the above Weyrick patent, but is formed with a sheath having a smaller cross section. The heater thus has less mass per unit length to reduce the time necessary to bring the sheath up to operating temperature. Such a heater sheath is also preferably formed with a greater length to reduce the heat dissipation per unit length without reducing the total heat available from a heating unit. The increased length requires more turns in a spirally shaped heater and accordingly the heater is attached to its supporting frame at a greater number of points to maintain the turns of the heater coplanar.

It is an object of this invention to reduce the number of ties required to secure a convoluted heater to a spider framework and this is accomplished by attaching each tie to two different turns or convolutions of the heater and anchoring each tie to one leg of the spider framework.

The foregoing and other objects are effected by the invention as will be apparent from the following description and claims taken in connection with the application, in which:

Fig. 1 is a plan view of a heating unit showing the invention;

Fig. 2 is a side elevation of Fig. 1 with the sheathed heater partially cut away; and Fig. 3 is a partial perspective from beneath the heater showing a tie member securing two heater turns to a supporting leg.

The drawings illustrate a heating unit of the type commonly used in range cooking platforms or the like. The heating unit comprises an inner heater 11 and an outer heater 12 each having a plurality of loops formed in a spiral. The inner heater comprises approximately four loops or complete turns whereas the outer heater has two turns of greater diameter. Although the invention is shown applied to a heating unit having two separate heaters, it may be applied to a similar unit having a single continuous heater.

Each of the heaters 11 and 12 comprises a tubular metal protective sheath enclosing a helically coiled electrical resistance wire extending almost the entire length of the sheath. The wire is electrically insulated from the sheath by a suitable granular material of good heat conductivity such as magnesium oxide. The heaters are generally triangular in cross section and are so formed by pressing the heaters after they are coiled in their spiral configuration. This pressing compacts the magnesium oxide and forms a flat upper heating surface for engagement with a cooking vessel or the like.

The upper heating surfaces of the two heaters 11 and 12 are substantially coplanar and their bottom surfaces rest on a supporting spider framework comprising a trio of legs 15, 16 and 17 which are generally parallel to the heating surface and may extend radially outwardly from a metal cylindrical member 18 at the center of the heater. The cylinder is open at its center to accommodate any of several well-known vessel temperature sensing devices (not shown) for providing temperature regulation of the surface unit. Such devices may be supported independently of the heating unit and form no part of the present invention. In heating units using no such vessel sensing device, the cylinder 18 may be omitted and the legs of the spider framework joined near the center of the unit as shown in the above Weyrick patent.

The heaters 11 and 12 have terminal portions 21 extending downward and outwardly beyond the periphery of the heater. These terminal portions extend through a drip shield 22 which prevents any material spilled on the heating loops from running along the terminal portions to the ends of the heaters where electrical connections are made. Extending from each end of the sheaths of the heaters 11 and 12 is a wire rod 23 that is electrically connected to the resistance wire within the sheath. Any suitable electrical connectors may be secured to the wire rods for making electrical connections to the heaters.

Attached to the underside of the heater loops are a plurality of U-shaped ties or stirrup members 25 interengaged with tongues 27 formed in the legs 15, 16 and 17 to secure the heaters to the legs. The legs may be stamped from sheet metal and each tongue is formed by cutting an L-shaped slot in the upper edge of one of the legs. The tongues in the legs 15 and 17 extend radially inwardly whereas the tongues at the leg 16 extend radially outwardly. Each of the stirrup members 25 bridges the space between two adjacent loops of the heaters 11 and 12 and has its ends secured as by welding to the sheaths at these loops. As seen most clearly in Fig. 3, a central portion 29 of each U-shaped stirrup hangs downwardly between the two bridged heater loops and extends beneath one of the tongues 27. As seen in Fig. 1, the stirrup members extend at an acute angle to both the leg members and the heater loops. The stirrup members 25 are formed of wire rod stock and their ends are flattened when welded to the heater sheath.

The legs 15 and 16 are formed of the same strip and the tongues in these legs extend in the same direction along the strip. The heater is assembled by first welding the stirrups 25 to the heaters and then slipping the tongues on the legs 15, 16 and 17 into the stirrup members before the legs are rigidly secured to the cylindrical member 18 as by welding. A bar 31 is welded to the lower edge of the cylindrical member 18 and to the drip shield 22 to provide better structural support between the heater supporting spider and the terminal portions of the heating unit.

As illustrated in the drawings, the heaters are secured at a plurality of points to prevent warpage of the upper flat surface of the heating unit while affording relative movement between the heater and the spider legs as the heater expands and contracts due to thermal changes. Each loop has preferably not more than three points at which it is held by the stirrup members and each stirrup member supports not more than one point of any heating loop at any one of the supporting legs. This construction reduces considerably the number of stirrup members required to adequately hold the heaters in position on the supporting spider and accordingly reduces the number of welds required.

While the invention has been shown in but one form,

What is claimed is:

1. An electrical heating unit comprising a convoluted sheathed heater, the convolutions of which are disposed in a plane for defining a flat cooking surface, a supporting framework in engagement with the underside of the heater, a plurality of ties for holding said heater to said framework, each of said ties having an intermediate portion movably connected to the framework and a pair of terminal portions immovably secured to spaced convolutions of the heater.

2. An electrically heated cooking unit comprising a tubular sheathed heater spiralled to provide a plurality of coplanar heating loops forming a substantially flat heating surface, a support for said heater comprising a trio of connected legs extending from adjacent the center of the heater outwardly in engagement with the underside of a plurality of said heating loops, a stirrup member for each of said legs and each stirrup member having a mid-portion engageable with its associated leg, said stirrup members having spaced end portions fixed to spaced loops of said heater so that each stirrup member anchors two heating loops to one of the legs, and means coupling said stirrup members to their respective legs and affording relative movement between the heater and said legs as the heater expands and contracts due to changes in temperature.

3. An electrical heating unit comprising a sheathed heater having a plurality of heating loops forming a flat cooking surface, a plurality of supporting legs extending generally parallel to said heating surface adjacent the underside of said heater, a plurality of pairs of interengaging tongue and stirrup members, each of said tongue members being attached to one of said legs, each of said stirrup members having a central portion engageable with a tongue member and a pair of spaced end portions secured to spaced loops of said heater so that each of said stirrups acts to secure portions of two loops to one of said legs, said interengaging members permitting sliding movement of said heater loops relative to said legs as the heater expands and contracts due to changes in its temperature.

4. In an electrically heated cooking unit, the combination of a sheathed convoluted heater, the convolutions of which are disposed in a plane for defining a flat cooking surface, a plurality of supporting legs extending from adjacent the center of the heater outwardly in engagement with the underside of the heater and means for attaching the heater to said supporting legs and including a plurality of horizontally extending tongues formed on the respective legs and a plurality of U-shape tie members associated, respectively, with said tongues, each of said tie members having a central portion engaging the underside of the tongue associated therewith and said tie members including a pair of spaced end portions secured to adjacent convolutions of the heater, said tie members functioning to secure two of the convolutions to one of said legs.

References Cited in the file of this patent
UNITED STATES PATENTS

| | | |
|---|---|---|
| 2,654,825 | Cunningham | Oct. 6, 1953 |
| 2,725,456 | Weyrick | Nov. 29, 1955 |